US012755451B2

(12) United States Patent
Yasui

(10) Patent No.: US 12,755,451 B2
(45) Date of Patent: Oct. 6, 2026

(54) DRAWING DATA EXAMINATION METHOD, DRAWING METHOD, DRAWING APPARATUS, AND NON-TRANSITORY STORAGE MEDIUM

(71) Applicant: NuFlare Technology, Inc., Yokohama (JP)

(72) Inventor: Kenichi Yasui, Kawasaki (JP)

(73) Assignee: NuFlare Technology, Inc., Yokohama (JP)

( * ) Notice: Subject to any disclaimer, the term of this patent is extended or adjusted under 35 U.S.C. 154(b) by 192 days.

(21) Appl. No.: 18/668,378

(22) Filed: May 20, 2024

(65) Prior Publication Data

US 2024/0404133 A1 Dec. 5, 2024

(30) Foreign Application Priority Data

May 29, 2023 (JP) ................................ 2023-087875

(51) Int. Cl.
*G06T 11/23* (2026.01)
*G06V 10/25* (2022.01)

(52) U.S. Cl.
CPC .............. *G06T 11/23* (2026.01); *G06V 10/25* (2022.01); *G06T 2210/21* (2013.01)

(58) Field of Classification Search
CPC ..... G06T 11/23; G06T 2210/21; G06V 10/25; G03F 7/70491; G03F 7/2059;
(Continued)

(56) References Cited

U.S. PATENT DOCUMENTS

| | | | |
|---|---|---|---|
| 7,446,899 | B2 | 11/2008 | Matsuoka |
| 8,886,350 | B2 | 11/2014 | Yamada et al. |

(Continued)

FOREIGN PATENT DOCUMENTS

| | | | |
|---|---|---|---|
| JP | 7-120408 | B2 | 12/1995 |
| JP | 2012-79739 | A | 4/2012 |

(Continued)

OTHER PUBLICATIONS

Combined Taiwanese Office Action and Search Report issued Sep. 2, 2025 in Taiwanese Patent Application No. 113115444, 4 pages.

(Continued)

*Primary Examiner* — Jeffery A Brier
(74) *Attorney, Agent, or Firm* — Oblon, McClelland, Maier & Neustadt, L.L.P.

(57) ABSTRACT

A drawing data examination method acquires coordinates representing the positions of a plurality of control points forming the B-spline curve; sets, as an examination target region of the drawing data, a region surrounded by a line segment connecting at least three or more control points adjacent to each other in the drawing data with a straight line after acquiring the coordinates; performs calculation processing of specifying a relative position of an examination target control point with respect to the examination target region by using the coordinates of the examination target control point and control points of the examination target region with respect to the examination target region; and determines whether the figure of the drawing data has an intersection by determining whether the examination target control point exists inside the examination target region based on the relative position.

5 Claims, 10 Drawing Sheets

(58) Field of Classification Search
CPC ... G03F 7/7055; H01J 37/3026; H01J 37/147; H01J 37/304; H01J 37/3177
See application file for complete search history.

(56) References Cited

U.S. PATENT DOCUMENTS

| | | | | |
|---|---|---|---|---|
| 9,148,631 | B2 | 9/2015 | Ono et al. | |
| 11,199,781 | B2 | 12/2021 | Yasui et al. | |
| 11,327,408 | B2 | 5/2022 | Yasui et al. | |
| 2015/0022530 | A1* | 1/2015 | Perry | G06T 9/20 345/441 |
| 2016/0284510 | A1* | 9/2016 | Hara | H01J 37/3026 |
| 2023/0053272 | A1* | 2/2023 | Yasui | H01J 37/3026 |

FOREIGN PATENT DOCUMENTS

| | | | |
|---|---|---|---|
| JP | 2020-64911 | A | 4/2020 |
| WO | WO-2012/057230 | A1 | 5/2012 |
| WO | WO-2019/058782 | A1 | 3/2019 |

OTHER PUBLICATIONS

Korean Office Action issued Sep. 3, 2025 in Korean Patent Application No. 10-2024-0067781 (with partial unedited computer-generated English translation), 10 pages.

* cited by examiner

DRAWING DATA EXAMINATION METHOD, DRAWING METHOD, DRAWING APPARATUS, AND NON-TRANSITORY STORAGE MEDIUM

CROSS-REFERENCE TO RELATED APPLICATIONS

This application is based upon and claims the benefit of priority from Japanese Patent Application No. 2023-087875, filed on May 29, 2023; the entire contents of which are incorporated herein by reference.

FIELD

The present invention relates to a drawing data examination method, a drawing method, a drawing apparatus, and a non-transitory storage medium.

BACKGROUND

For example, a multibeam drawing apparatus configured to emit a large number of beams at a time by using multiple beams is known as an electron beam drawing apparatus. The multibeam drawing apparatus performs electron beam drawing based on drawing data. In a case where the drawing data includes a curved figure, the curved figure is approximated to a B-spline curve as one of parameter curves for mask data amount reduction.

For efficiency of rasterization processing, it is assumed that a curved figure produced with a B-spline curve does not have an intersection within the same figure. Thus, it is needed to examine whether an intersection place exists inside a curved figure of drawing data.

The B-spline curve is produced with a plurality of control points. The coordinate position of each control point is defined with an integer. However, the position of an intersection point of the B-spline curve is calculated in floats, and thus unexpected examination error potentially occurs. Furthermore, a high-order equation needs to be solved to calculate the above-described intersection point, and thus examination potentially needs a large amount of time.

DETAILED DESCRIPTION

Figure 1:
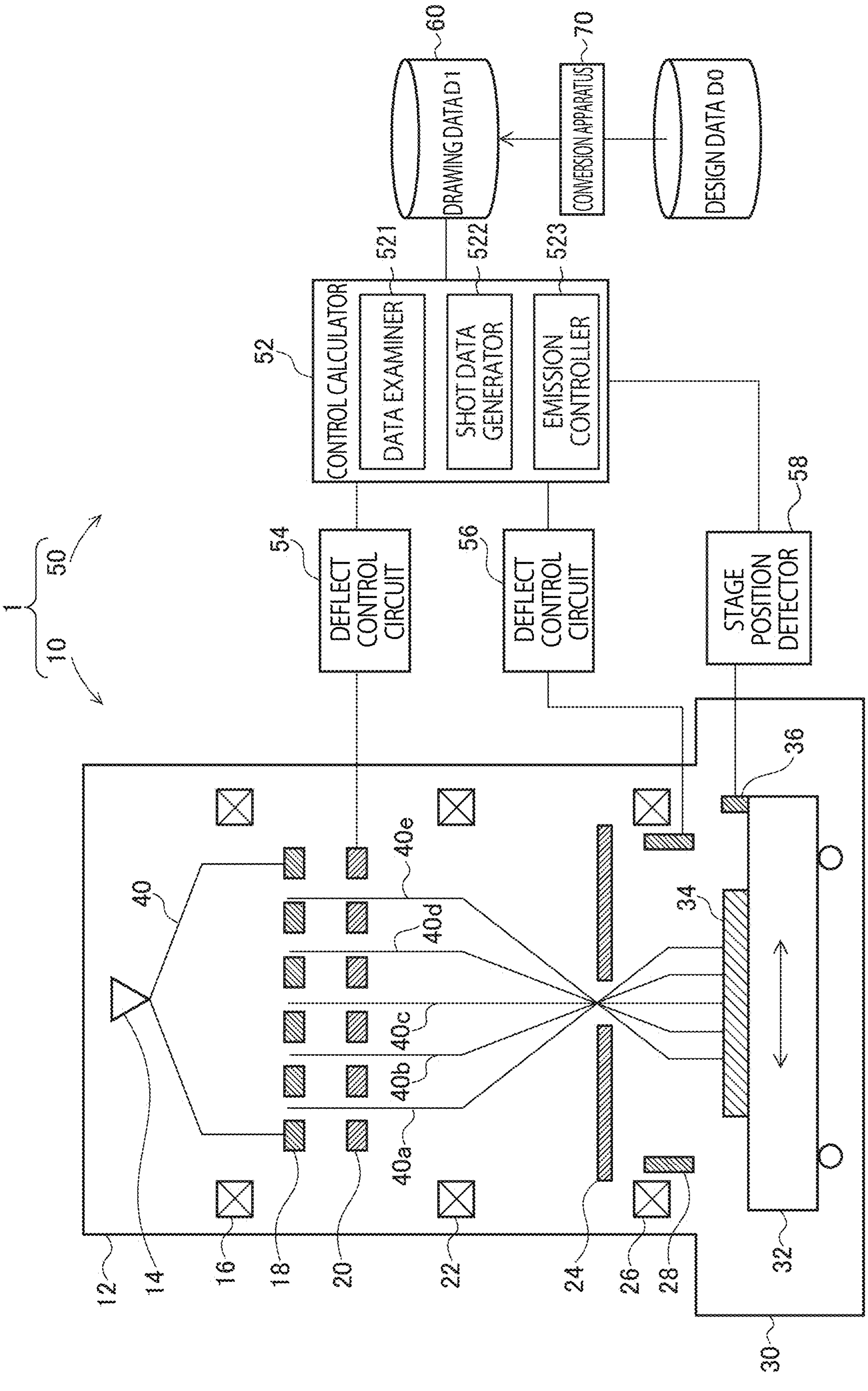
FIG. 1 is a schematic diagram of a multi-charged particle beam drawing apparatus according to a first embodiment.

Embodiments will now be explained with reference to the accompanying drawings. The present invention is not limited to the embodiments.

A drawing data examination method according to an aspect of the present invention is a drawing data examination method for examining drawing data of a figure expressed by a B-spline curve, the drawing data being used by a drawing apparatus. The examination method acquires coordinates representing the positions of a plurality of control points forming the B-spline curve; sets, as an examination target region of the drawing data, a region surrounded by a line segment connecting at least three or more control points adjacent to each other in the drawing data with a straight line after acquiring the coordinates; performs calculation processing of specifying a relative position of an examination target control point with respect to the examination target region by using the coordinates of the examination target control point and control points of the examination target region with respect to the examination target region; and determines whether the figure of the drawing data has an intersection by determining whether the examination target control point exists inside the examination target region based on the relative position.

First Embodiment

FIG. 1 is a schematic diagram of a multi-charged particle beam drawing apparatus according to a first embodiment. In the present embodiment, a configuration in which an electron beam is used as an example of a charged particle beam will be described below. However, a charged particle beam is not limited to an electron beam but may be another charged particle beam such as an ion beam. Moreover, a drawing apparatus is of a multibeam scheme in the present embodiment but may be of a single beam scheme.

A drawing apparatus 1 according to the present embodiment, which is illustrated in FIG. 1 includes a drawer 10 configured to draw a desired pattern by irradiating a target object such as a mask or a wafer with an electron beam, and a controller 50 configured to control drawing operation of the drawer 10. The drawer 10 includes an electron beam lens barrel 12 and a drawing chamber 30.

An electron gun 14, an illumination lens 16, a shaping aperture array member 18, a blanking aperture array plate 20, a reducing lens 22, a restricting aperture member 24, an objective lens 26, and a deflector 28 are disposed in the electron beam lens barrel 12. An XY stage 32 is disposed in the drawing chamber 30. A mask blank 34 that is a drawing target substrate is placed on the XY stage 32. The target object is, for example, a wafer, or an exposure mask with which a pattern is transferred onto a wafer by using a reduced projection type exposure device or an extreme ultraviolet exposure device, such as a stepper or a scanner, with an excimer laser as a light source. The drawing target substrate is, for example, a mask on which a pattern is already formed. For example, a Levenson type mask needs two times of drawing, and thus the second pattern is drawn on a mask fabricated by the first drawing in some cases. In addition, a mirror 36 for position measurement of the XY stage 32 is disposed on the XY stage 32.

The controller 50 includes a control calculator 52, deflect control circuits 54 and 56, and a stage position detector 58. The control calculator 52, the deflect control circuits 54 and 56, and the stage position detector 58 are connected to each other through a bus.

An electron beam 40 discharged from the electron gun 14 is substantially vertically incident on the entire shaping aperture array member 18 through the illumination lens 16. The shaping aperture array member 18 is formed with holes (opening parts) in a matrix of rows and columns at a predetermined array pitch. The electron beam 40 is incident on a region including all holes of the shaping aperture array member 18. As part of the electron beam 40 passes through each of the plurality of holes, multiple beams 40*a* to 40*e* as illustrated in FIG. 1 are formed.

The blanking aperture array plate 20 is formed with pass holes in accordance with disposition positions of the holes of the shaping aperture array member 18, and a blanker made of a pair of electrodes is disposed at each pass hole. The electron beams 40*a* to 40*e* passing through the pass holes are each independently deflected by voltage applied by the corresponding blanker. Blanking control is performed by the deflection. In this manner, the plurality of blankers each perform blanking deflection of the corresponding beam among the multiple beams passing through the plurality of holes of the shaping aperture array member 18.

The multiple beams 40*a* to 40*e* having passed through the blanking aperture array plate 20 are reduced by the reducing lens 22 and travel toward a central hole formed at the restricting aperture member 24. An electron beam deflected by a blanker of the blanking aperture array plate 20 is shifted from the central hole of the restricting aperture member 24 and shielded by the restricting aperture member 24. An electron beam not deflected by a blanker of the blanking aperture array plate 20 passes through the central hole of the restricting aperture member 24.

In this manner, the restricting aperture member 24 shields any beam deflected to become a beam "OFF" state by a blanker of the blanking aperture array plate 20. Beams having passed through the restricting aperture member 24 between "beam ON" and "beam OFF" are beams of one shot. The multiple beams 40*a* to 40*e* having passed through the restricting aperture member 24 are focused through the objective lens 26 and form a pattern image at a desired reduction ratio. The beams (all of the multiple beams) having passed through the restricting aperture member 24 are collectively deflected into the same direction by the deflector 28 and each incident on the corresponding incidence position on the mask blank 34.

Such control is performed by the deflector 28 that the incidence position of a beam follows movement of the XY stage 32 when the XY stage 32 is continuously moving. The XY stage 32 is moved by a stage controller (not illustrated), and the position of the XY stage 32 is detected by the stage position detector 58.

Multiple beams emitted at a time are ideally arranged at a pitch calculated by multiplying the array pitch of the plurality of holes of the shaping aperture array member 18 by the above-described desired reduction ratio. The drawing apparatus performs drawing operation in a raster scanning scheme of continuously emitting shot beams in order, and in a case where a desired pattern is drawn, necessary beams are controlled to "beam ON" by blanking control in accordance with the pattern. When the XY stage 32 is continuously moving, the incidence position of a beam is controlled by the deflector 28 to follow movement of the XY stage 32.

As illustrated in FIG. 1, the control calculator 52 includes a data examiner 521, a shot data generator 522, and an emission controller 523. The data examiner 521 examines drawing data D1 read from a storage device 60. The method of the examination by the data examiner 521 will be described later.

In a case where the drawing data D1 passes the examination by the data examiner 521, the shot data generator 522 generates shot data unique to the device by performing data conversion processing at a plurality of stages on the drawing data D1. The shot data defines, for example, an emission amount and an incidence position coordinate of each shot. For example, the shot data generator 522 allocates a figure pattern defined in the drawing data D1 to corresponding pixels. Then, the shot data generator 522 calculates, for each pixel, area density of the figure pattern to be disposed.

The emission controller 523 calculates, for each pixel, an emission amount of electron beams per shot. For example, an emission amount proportional to the area density of each pixel is calculated and corrected with taken into account dimension variation due to a proximity effect, a color cast effect, a loading effect, and the like.

The emission controller 523 outputs the emission amount of each shot, which is calculated based on the shot data, to the deflect control circuit 54. The deflect control circuit 54 calculates an emission time t by dividing the input emission amount by current density. Then, when performing the corresponding shot, the deflect control circuit 54 applies deflection voltage to the corresponding blanker of the blanking aperture array plate 20 so that the blanker becomes "beam ON" for the emission time t.

The emission controller 523 also outputs deflection position data to the deflect control circuit 56 so that each beam is deflected to a position (coordinate) indicated by the shot data. The deflect control circuit 56 calculates a deflection amount and applies deflection voltage to the deflector 28. Accordingly, multiple beams that are shot this time are collectively deflected.

The drawing data D1, which is an examination target of the data examiner 521, will be described below. The drawing data D1 is generated based on design data (CAD data) D0 at a conversion apparatus 70. The design data D0 is, for example, arrangement data that designs arrangement of semiconductor integrated circuits.

The design data D0 includes a curved figure. For the curved figure, the conversion apparatus 70 calculates a plurality of control points for expressing (parametric curve expression) a B-spline curve and calculates coordinate positions of the control points. The conversion apparatus 70 calculates, for each control point, displacement from any adjacent control point in the drawing data D1.

Figure 2:
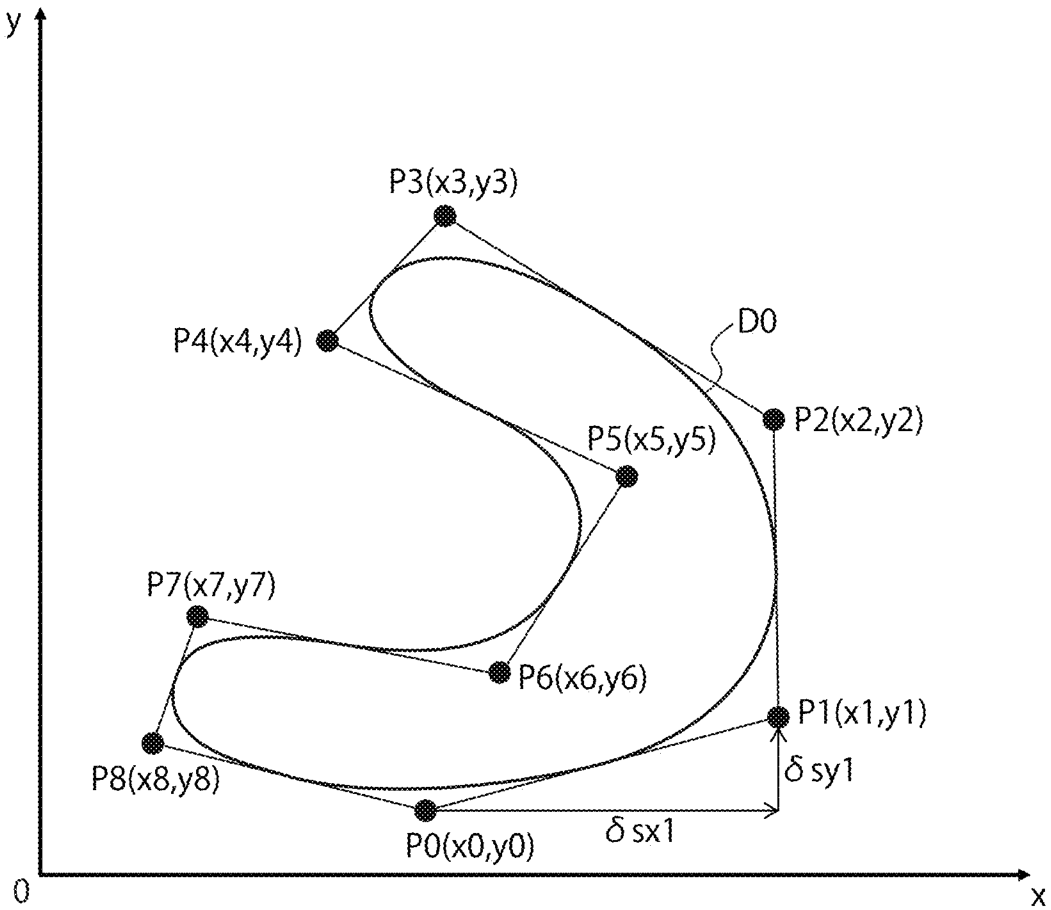
FIG. 2 is a diagram illustrating an example of design data D0.

FIG. 2 is a diagram illustrating an example of the design data D0. The design data D0 is formed of a closed curve. The closed curve is approximated to a B-spline curve formed of nine control points P0 to P8. The conversion apparatus 70 calculates the control points P0 to P8 with which the closed curve is approximated. In the present embodiment, the control points P0 to P8 are sequentially provided with control point numbers in accordance with positions on the drawing data D1. The conversion apparatus 70 generates the drawing data D1 by expressing the coordinate position of a control point as a displacement from any other control point adjacent to the control point in the drawing data D1.

For example, in FIG. 2, the coordinate (x0, y0) of the control point P0 is defined as a figure disposition origin of the curved figure. The coordinate position of the control point P1 adjacent to the control point P0 on the drawing data D1 and having the next control point number is defined by an x-directional displacement δx1 and a y-directional displacement δy1 with respect to the control point P0. Similarly to the coordinate position of the control point P1, the coordinate positions of the control points P2 to P8 are each defined by x-directional and y-directional displacements with respect to the control point of the previous control point number on the drawing data D1. The conversion apparatus 70 defines the x and y coordinates of the control points P0 to P8 with integers.

The data examiner 521 examines the drawing data D1 formed of the control points P0 to P8 and calculated as described above. Methods of examining the drawing data D1 by the data examiner 521 will be described below.

First, an examination method for checking whether a curve has an intersection when the drawing data D1 is produced will be described below with reference to FIGS. 3 and 4. In this examination method, in a case where there is a violation control point at which the curve has an intersection, processing of eliminating the violation control point is performed so that the curve finally has no intersection in the drawing data D1.

Figure 3:
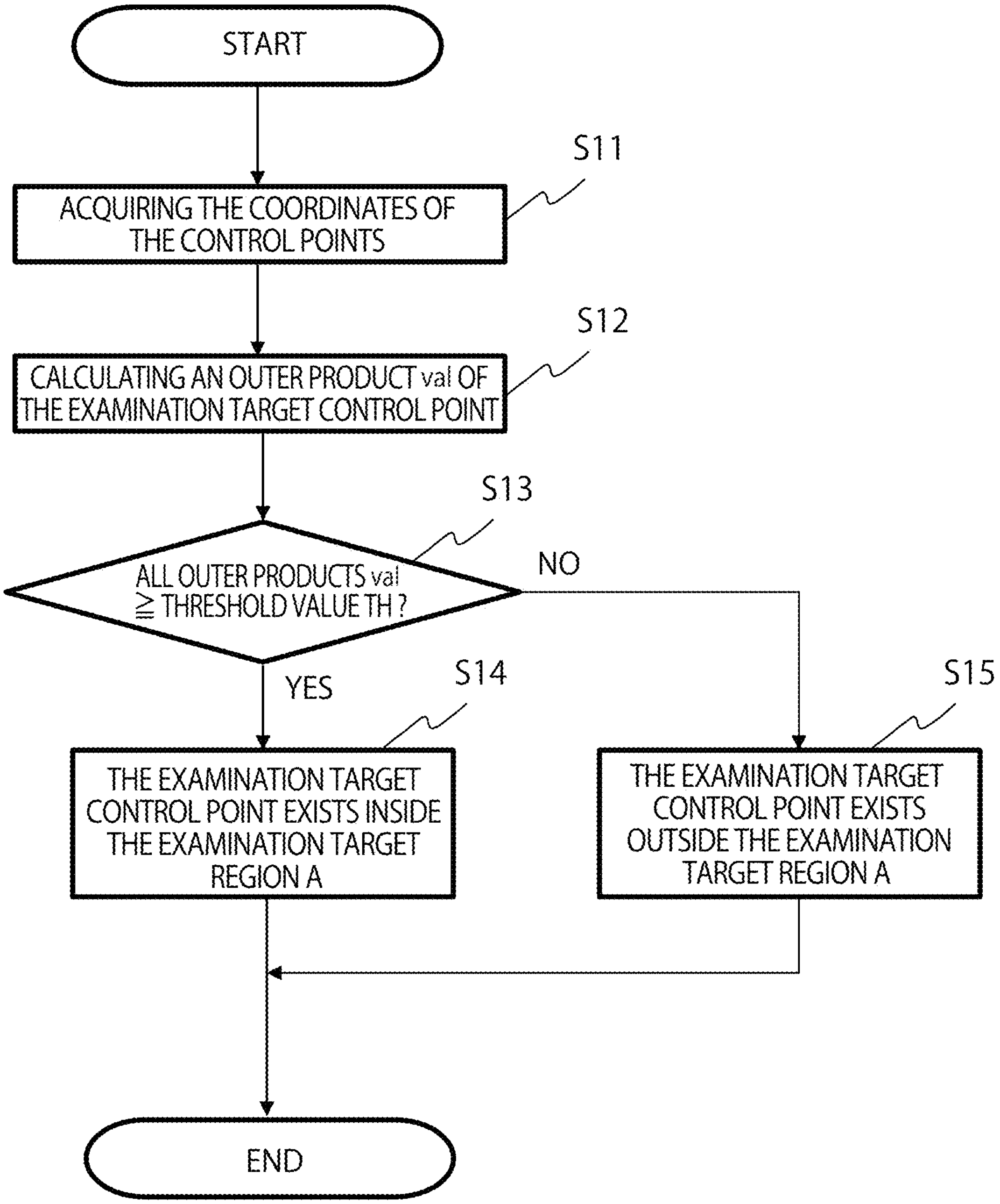
FIG. 3 is a flowchart for describing an example of the procedure of a drawing data examination method.
Figure 4:
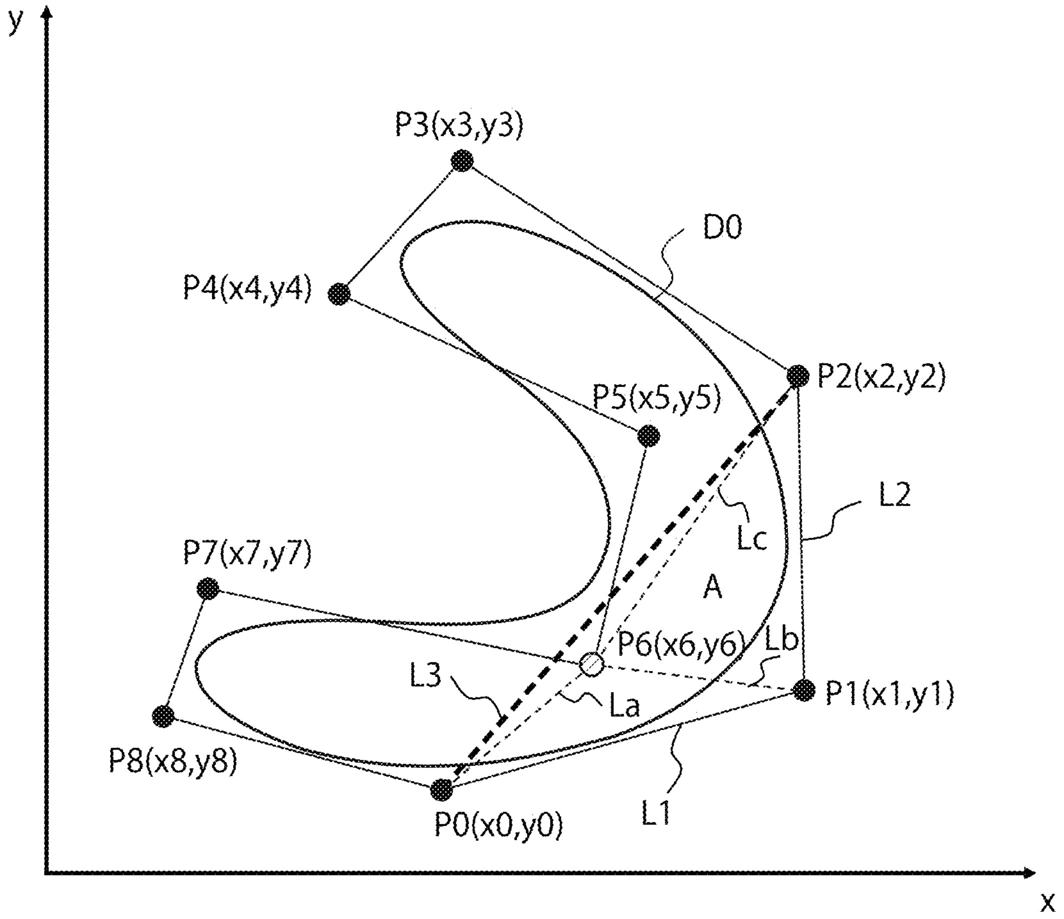
FIG. 4 is a diagram for describing the drawing data examination method performed in accordance with the flowchart illustrated in FIG. 3.

FIG. 3 is a flowchart for describing an example of the procedure of a method for examining the drawing data D1. FIG. 4 is a diagram for describing the method for examining the drawing data D1, which is performed in accordance with the flowchart illustrated in FIG. 3.

In the examination method described below with reference to FIGS. 3 and 4, the data examiner 521 examines whether an examination target control point exists inside an examination target region. The examination target region is a region surrounded by a line segment connecting three or more control points in the drawing data D1 with a straight line. On the other hand, the examination target control point is a control point different from the three or more control points constituting the examination target region.

First, the data examiner 521 acquires the coordinates of the control points P0 to P8 in the drawing data D1 from the storage device 60 (step S11).

Subsequently, the data examiner 521 calculates an outer product val of the examination target control point (step S12). At step S12, for example, the data examiner 521 sets, as a minimum examination target region A, a triangle connecting the control points P0, P1, and P2 with line segments L1 to L3, respectively, as illustrated in FIG. 4. In this case, the data examiner 521 sets, as the examination target control point, each of the control points P3 to P8, which are not adjacent to the control points P0 to P2 in the drawing data D1.

Subsequently, the data examiner 521 calculates the outer product val of each examination target control point for the line segments L1 to L3 surrounding the examination target region A. The following description will be made on a case where the examination target control point is the control point P6.

The data examiner 521 calculates an outer product val1 by using Expression (1) below.

$$val1 = x1 \times y6 - y1 \times x6 \quad (1)$$

The data examiner 521 converts the coordinate (x0, y0) of the control point P0 into the origin (0, 0) and calculates, as the outer product val1, the vector outer product of a line segment (vector) La connecting the control point P0 to the control point P6 with a straight line and the line segment (vector) L1 connecting the control point P0 to the control point P1 with a straight line. In this case, the data examiner 521 converts the coordinate (x1, y1) of the control point P1 and the coordinate (x6, y6) of the control point P6 into coordinates in a coordinate system having an origin at the coordinate of the control point P0.

Subsequently, the data examiner 521 calculates an outer product val2 by using Expression (2) below.

$$val2 = x2 \times y6 - y2 \times x6 \quad (2)$$

The data examiner 521 converts the coordinate (x1, y1) of the control point P1 into the origin (0, 0) and calculates, as the outer product val2, the vector outer product of a line segment (vector) Lb connecting the control point P1 to the control point P6 with a straight line and the line segment (vector) L2 connecting the control point P1 to the control point P2 with a straight line. In this case, the data examiner 521 converts the coordinate (x2, y2) of the control point P2 and the coordinate (x6, y6) of the control point P6 into coordinates in a coordinate system having an origin at the coordinate of the control point P1.

Lastly, the data examiner 521 calculates an outer product val3 by using Expression (3) below.

$$val3 = x0 \times y6 - y0 \times x6 \quad (3)$$

The data examiner 521 converts the coordinate (x2, y2) of the control point P2 into the origin (0, 0) and calculates, as the outer product val3, the vector outer product of a line segment (vector) Lc connecting the control point P2 to the control point P6 with a straight line and the line segment (vector) L3 connecting the control point P2 to the control point P0 with a straight line. In this case, the data examiner 521 converts the coordinate (x0, y0) of the control point P0 and the coordinate (x6, y6) of the control point P6 into coordinates in a coordinate system having an origin at the coordinate of the control point P2.

At step S12, the outer products val with the line segments L1 to L3 are calculated for the remaining control points by using the formulae as described above.

After the calculation of the outer products val, the data examiner 521 compares the values of all outer products val with a threshold value TH (step S13). In the present embodiment, since the coordinate of a control point P is converted into the origin when the outer product val thereof is calculated, the threshold value TH is set to zero.

For example, in a case of the outer product val1≥the threshold value TH, the control point P6 is positioned on the left side of the line segment (vector) L1 or on the line segment (vector) L1. On the other hand, in a case of the outer product val1<the threshold value TH, the control point P6 is positioned on the right side of the line segment (vector) L1.

In a case of the outer product val2≥the threshold value TH, the control point P6 is positioned on the left side of the line segment (vector) L2 or on the line segment (vector) L2. In a case of the outer product val2<the threshold value TH, the control point P6 is positioned on the right side of the line segment (vector) L2.

In a case of the outer product val3≥the threshold value TH, the control point P6 is positioned on the left side of the line segment (vector) L3 or on the line segment (vector) L3.

In a case of the outer product val3<the threshold value TH, the control point P6 is positioned on the right side of the line segment (vector) L3.

In a case where all outer products val1 to val3 are equal to or larger than the threshold value TH as a result of the comparison of the outer products val1 to val3 with the threshold value TH as described above, the control point P6 is positioned on the left side of the line segments (vectors) L1 to L3 or on either line segment. Thus, the data examiner 521 determines that the control point P6 exists inside the examination target region A surrounded by the line segments (vectors) L1 to L3 (step S14). In this case, the control point P6 is regarded as a violation control point and the drawing data D1 fails the examination.

On the other hand, in a case where any one of the outer products val1 to val3 is smaller than the threshold value TH, the data examiner 521 determines that the control point P6 exists outside the examination target region A (step S15). In this case, the control point P6 is regarded as a passing control point. In a case where all examination target control points are passing control points, the drawing data D1 passes the examination.

After the examination of whether a control point exists inside the examination target region A ends as described above, the data examiner 521 sets, as the next examination target region to the examination target region A, a triangle connecting the control points P1, P2, and P3 with straight lines. Then, the data examiner 521 examines whether an examination target control point exists inside the set examination target region as in the examination of the examination target region A. In this manner, each time an examination target region is set, the data examiner 521 examines whether an examination target control point exists inside the examination target region.

An examination method for checking whether two line segments each connecting control points with a straight line intersect each other when the drawing data D1 is produced will be described below with reference to FIGS. 5 and 6.

Figure 5:
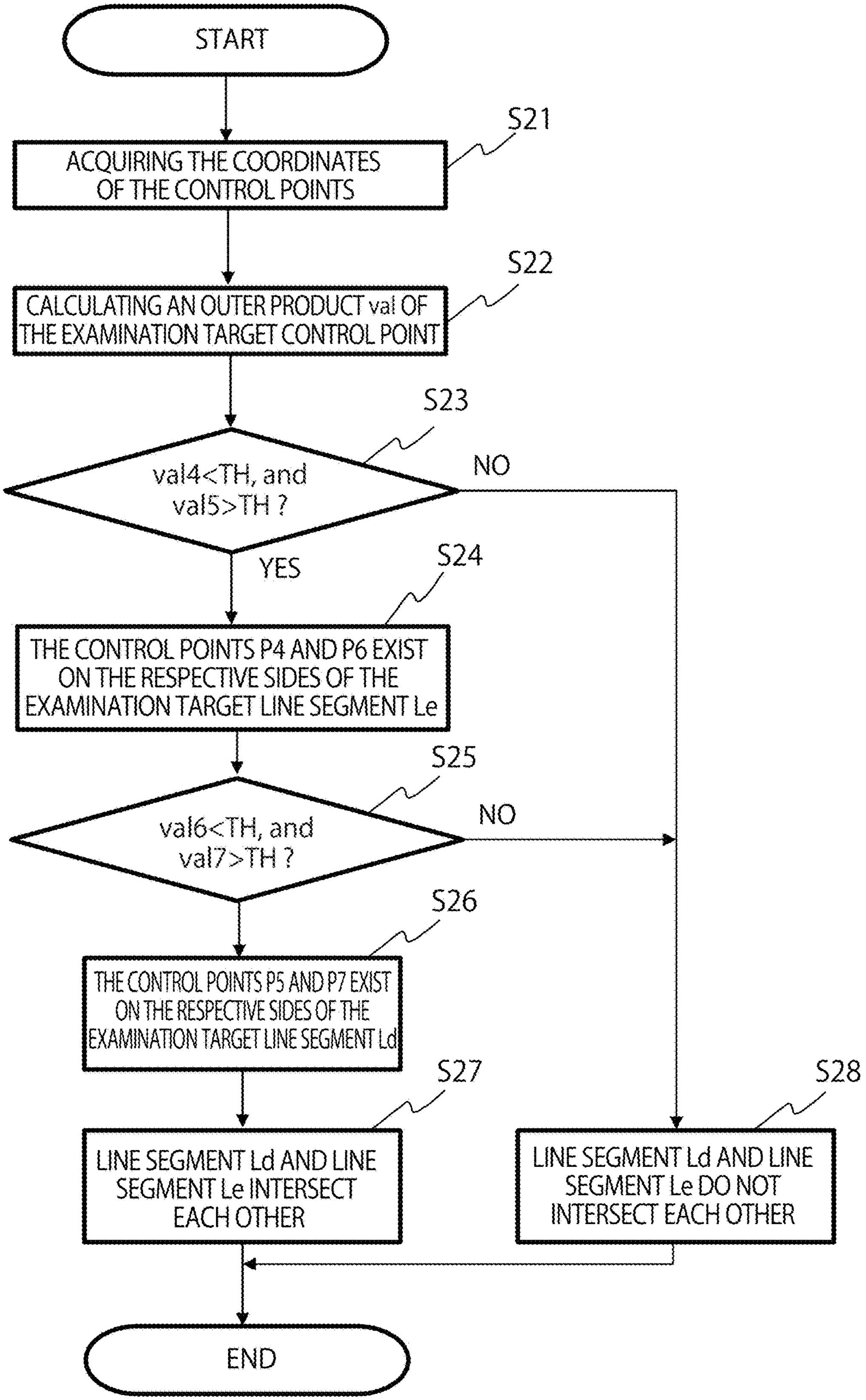
FIG. 5 is a flowchart for describing another example of the procedure of the drawing data examination method.
Figure 6:
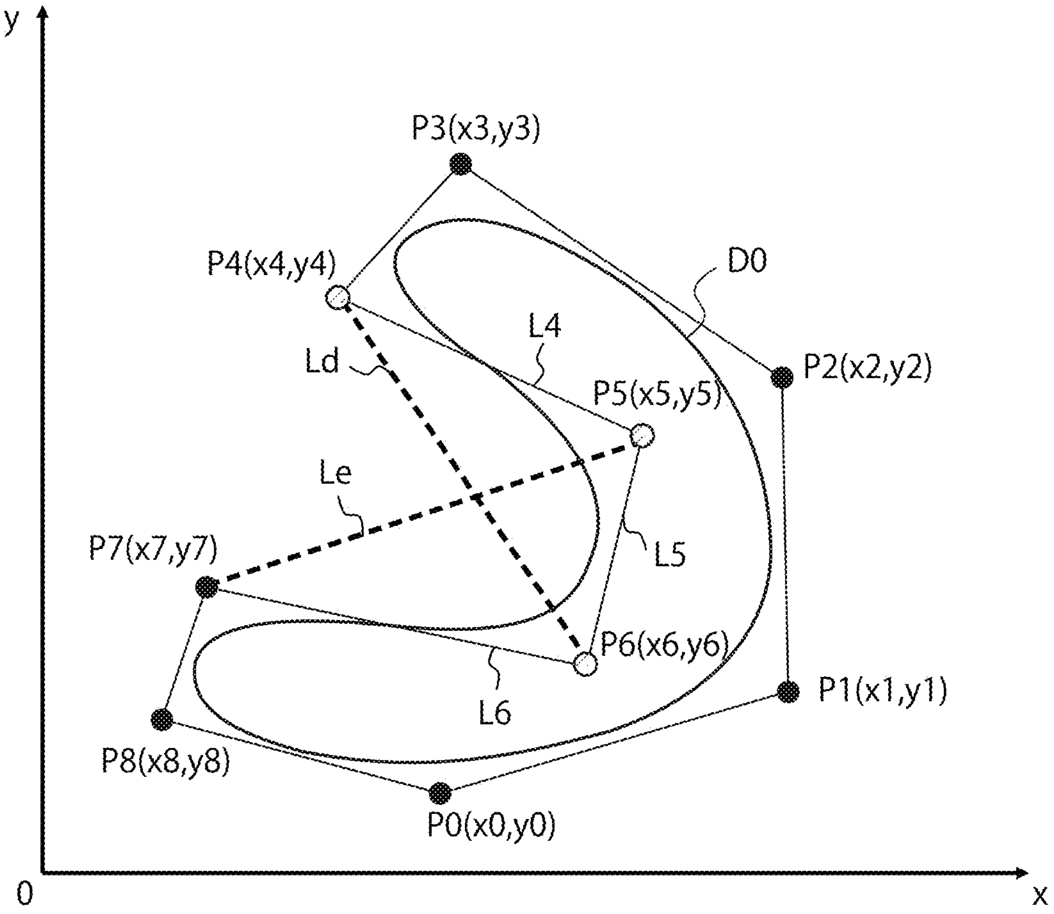
FIG. 6 is a diagram for describing the drawing data examination method performed in accordance with the flowchart illustrated in FIG. 5.

FIG. 5 is a flowchart for describing another example of the procedure of a method for examining the drawing data D1. FIG. 6 is a diagram for describing the method for examining the drawing data D1, which is performed in accordance with the flowchart illustrated in FIG. 5.

In the examination method described below with reference to FIGS. 5 and 6, the data examiner 521 examines whether two examination target line segments intersect each other under the condition of a curve order p=2 in the drawing data D1.

First, the data examiner 521 acquires the coordinates of the control points P0 to P8 in the drawing data D1 from the conversion apparatus 70 (step S21).

Subsequently, the data examiner 521 calculates the outer product val of any examination target control point (step S22). At step S22, the data examiner 521 sets two control points adjacent to each other in the drawing data D1 as examination target control points. The following describes a case where, as illustrated in FIG. 6, the data examiner 521 sets the control point P4 (first examination target control point) and the control point P5 (second examination target control point) as examination target control points. In this case, the data examiner 521 examines whether an examination target line segment Ld (first line segment) and an examination target line segment Le (second line segment) intersect each other by calculating the outer products val of the examination target control points.

The examination target line segment Ld is a line segment (vector) connecting, with a straight line, the control point P4 to the control point P6, which is apart from the control point P4 with one control point number therebetween. On the other hand, the examination target line segment Le is a line segment (vector) connecting, with a straight line, the control point P5 to the control point P7, which is apart from the control point P5 with one control point number therebetween.

To examine whether the examination target line segments (vectors) Ld and Le intersect each other, the data examiner 521 calculates an outer product val4 of the control point P4 for the examination target line segment (vector) Le by using Expression (4) below and calculates an outer product val5 of the control point P6 for the examination target line segment (vector) Le by using Expression (5) below.

$$val4 = x7 \times y4 - y7 \times x4 \tag{4}$$

$$val5 = x7 \times y6 - y7 \times x6 \tag{5}$$

When calculating the outer product val4, the data examiner 521 converts the coordinate (x5, y5) of the control point P5 into the origin (0, 0) and calculates, as the outer product val4, the vector outer product of the line segment (vector) Le and a line segment (vector) L4 connecting the control point P5 to the control point P4 with a straight line. In this case, the data examiner 521 converts the coordinate (x4, y4) of the control point P4 and the coordinate (x7, y7) of the control point P7 into coordinates in a coordinate system having an origin at the coordinate of the control point P5.

When calculating the outer product val5, as in the calculation of the outer product val4, the data examiner 521 converts the coordinate (x5, y5) of the control point P5 into the origin (0, 0) and calculates, as the outer product val5, the vector outer product of the line segment (vector) Le and a line segment (vector) L5 connecting the control point P5 to the control point P6 with a straight line. In this case as well, the data examiner 521 converts the coordinate (x6, y6) of the control point P6 and the coordinate (x7, y7) of the control point P7 into coordinates in a coordinate system having an origin at the coordinate of the control point P5.

Subsequently, the data examiner 521 calculates an outer product val6 of the control point P5 for the examination target line segment Ld by using Expression (6) below and calculates an outer product val7 of the control point P7 for the examination target line segment Ld by using Expression (7) below.

$$val6 = x4 \times y5 - y4 \times x5 \tag{6}$$

$$val7 = x4 \times y7 - y4 \times x7 \tag{7}$$

When calculating the outer product val6, the data examiner 521 converts the coordinate (x6, y6) of the control point P6 into the origin (0, 0) and calculates, as the outer product val6, the vector outer product of the line segment (vector) Ld and the line segment (vector) L5. In this case, the data examiner 521 converts the coordinate (x4, y4) of the control point P4 and the coordinate (x5, y5) of the control point P5 into coordinates in a coordinate system having an origin at the coordinate of the control point P6.

When calculating the outer product val7, as in the calculation of the outer product val6, the data examiner 521 converts the coordinate (x6, y6) of the control point P6 into the origin (0, 0) and calculates, as the outer product val7, the vector outer product of the line segment (vector) Ld and a line segment (vector) L6 connecting the control point P6 to the control point P7 with a straight line. In this case as well, the data examiner 521 converts the coordinate (x5, y5) of the control point P5 and the coordinate (x7, y7) of the control point P7 into coordinates in a coordinate system having an origin at the coordinate of the control point P6.

After the calculation of the outer products val4 to val7, the data examiner 521 compares the values of the outer products val4 and val5 with the threshold value TH (step S23). In the present embodiment, since the coordinate of the control point P5 is converted into the origin when the outer products val4 and val5 are calculated, the threshold value TH is set to zero.

In a case of val4<TH, the control point P4 is positioned on the right side of the examination target line segment Le. In a case of val5>TH, the control point P6 is positioned on the left side of the examination target line segment Le. Thus, in a case of val4<TH and val5>TH, the data examiner 521 determines that the control points P4 and P6 exist on the respective sides of the examination target line segment Le (step S24). The existence of the control points P4 and P6 on the respective sides of the examination target line segment Le, in other words, means that the control points P4 and P6 face each other with the examination target line segment Le interposed therebetween.

In a case where the control points P4 and P6 exist on the respective sides of the examination target line segment Le, the data examiner 521 compares the values of the outer products val6 and val7 with the threshold value TH (step S25). In the present embodiment, since the coordinate of the control point P6 is converted into the origin when the outer products val6 and val7 are calculated, the threshold value TH is set to zero.

In a case of val6<TH, the control point P5 is positioned on the right side of the examination target line segment Ld. In a case of val7>TH, the control point P7 is positioned on the left side of the examination target line segment Ld. Thus, in a case of val6<TH and val7>TH, the data examiner 521 determines that the control points P5 and P7 exist on the respective sides of the examination target line segment Ld (step S26). The existence of the control points P5 and P7 on the respective sides of the examination target line segment Ld, in other words, means that the control points P5 and P7 face each other with the examination target line segment Ld interposed therebetween.

As described above, the examination target line segment Ld is a line segment connecting the control points P4 and P6 with a straight line, and the examination target line segment Le is a line segment connecting the control points P5 and P7 with a straight line. Accordingly, the existence of the control points P4 and P6 on the respective sides of the examination target line segment Le and the existence of the control points P5 and P7 on the respective sides of the examination target line segment Ld mean that the examination target line segment Ld and the examination target line segment Le intersect each other. Thus, the data examiner 521 determines that the examination target line segment Ld and the examination target line segment Le intersect each other (step S27). In this case, the control points P4 and P5 are regarded as violation control points and the drawing data D1 fails the examination.

On the other hand, in a case where the condition that the control points P4 and P6 exist on the respective sides of the examination target line segment Le and the control points P5 and P7 exist on the respective sides of the examination target line segment Ld is not satisfied, the data examiner 521 determines that the examination target line segment Ld and the examination target line segment Le do not intersect each other (step S28). In this case, the control points P4 and P5 are regarded as passing control points.

After the intersection determination of the control points P4 and P5 ends as described above, the data examiner 521 sets other two control points adjacent to each other in the drawing data D1 as examination target control points and performs intersection determination of the examination target control points. In this manner, each time examination target control points are set, the data examiner 521 examines intersection of examination target line segments having ends at the respective examination target control points.

In the above-described present embodiment, the data examiner 521 determines a result of examination of the drawing data D1 by determining whether an examination target control point P[k] (k: control point number) is included inside a region surrounded by control points P[i], P[i+1], . . . , P[i+p] (P: control point, p: curve order, i: control point number) of a B-spline curve expressed with integer coordinates.

In the present embodiment, in a case where the curve order p is two, the data examiner 521 determines an examination result by determining whether an examination target line segment L[i] (first examination target line segment) connecting the control point P[i] and the control point P[i+2] and an examination target line segment L[k] (second examination target line segment) connecting the control point P[k−1] and the control point P[k] (where k≠i+1) intersect each other.

In any of the above-described examination methods, the data examiner 521 specifies the relative position (positional relation) of an examination control point with respect to a line segment connecting control points different from the examination control point with a straight line through outer product calculation processing using integer coordinates of a B-spline curve and determines an examination result of the drawing data D1 based on the specified relative position. Accordingly, calculation in floats and calculation of the solution of a high-order equation are unnecessary in the process of examination of the drawing data D1. Thus, drawing data including a curved figure can be examined at high accuracy and high speed.

First Modification

A first modification of the first embodiment will be described below. The following description is mainly made on any difference from the first embodiment. In the present modification, the configuration of the drawing data D1 is different from that in the first embodiment.

Figure 7:
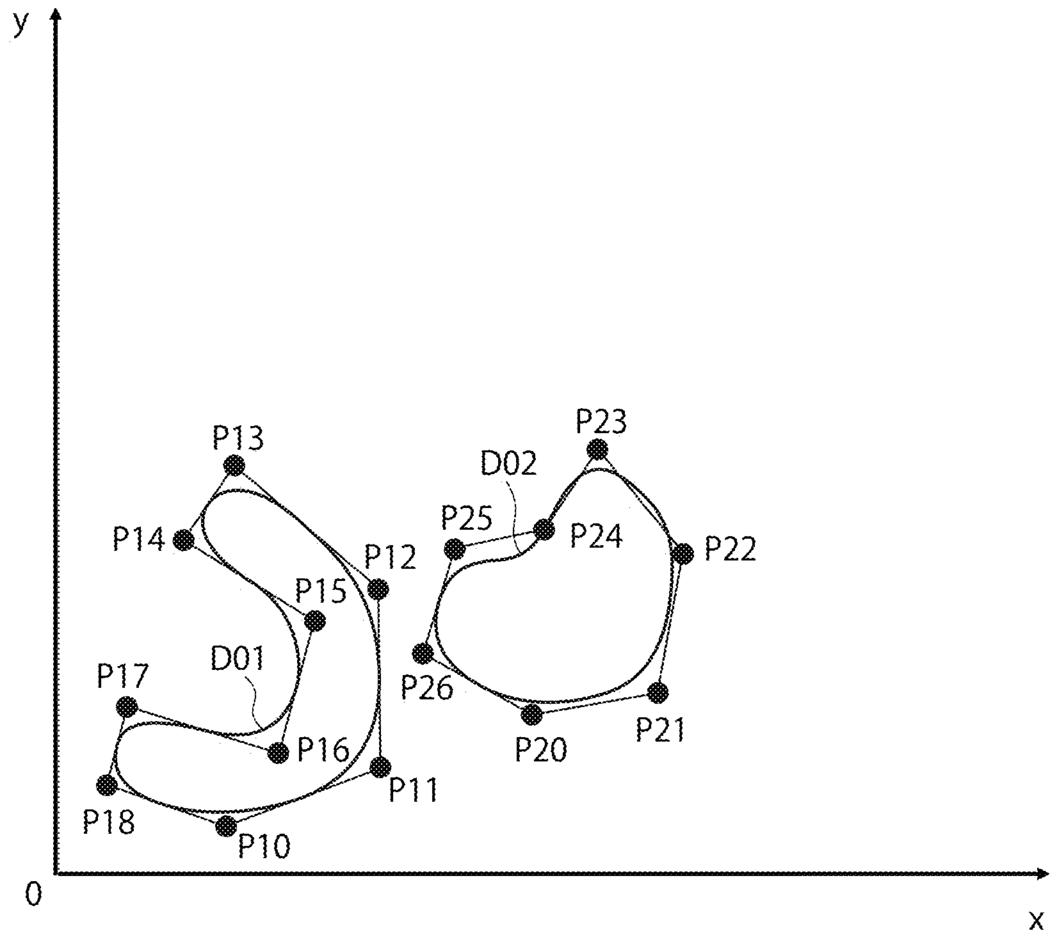
FIG. 7 is a diagram illustrating design data according to a first modification.

FIG. 7 is a diagram illustrating design data according to the first modification. In the first embodiment described above, an examination target of the data examiner 521 is the drawing data D1 of one figure that approximates the design data D0 to a B-spline curve surrounding with the nine control points P0 to P8.

On the other hand, in the present modification, as illustrated in FIG. 7, the drawing data D1 includes a figure that approximates design data D01 to a B-spline curve surrounding with nine control points P10 to P18, and a figure that approximates design data D02 to a B-spline curve surrounding with seven control points P20 to P26. The two figures illustrated in FIG. 7 have shapes different from each other but may have identical shapes.

In the present modification, as in the examination method described first in the first embodiment, for example, the data examiner 521 examines whether an examination target control point exists inside the examination target region for each of the two figures included in the drawing data D1 in a case where the examination target region is a triangle connecting three points with straight lines.

In a case where the curve order of the drawing data D1 is two, as in the examination method described second in the first embodiment, the data examiner 521 may determine intersection of examination target line segments having ends at two control points, respectively, adjacent to each other for each of the two figures included in the drawing data D1.

In the present modification described above, as well, the data examiner 521 determines an examination result through outer product calculation processing in integers as in the first embodiment. Accordingly, calculation in floats and calculation of the solution of a high-order equation are unnecessary in the process of examination of the drawing data D1. Thus, drawing data formed of a plurality of figures including a curved figure can be examined at high accuracy and high speed.

Second Modification

A second modification of the first embodiment will be described below. The following description is mainly made on any difference from the first embodiment. In the present modification as well, the configuration of the drawing data D1 is different from that in the first embodiment.

Figure 8:
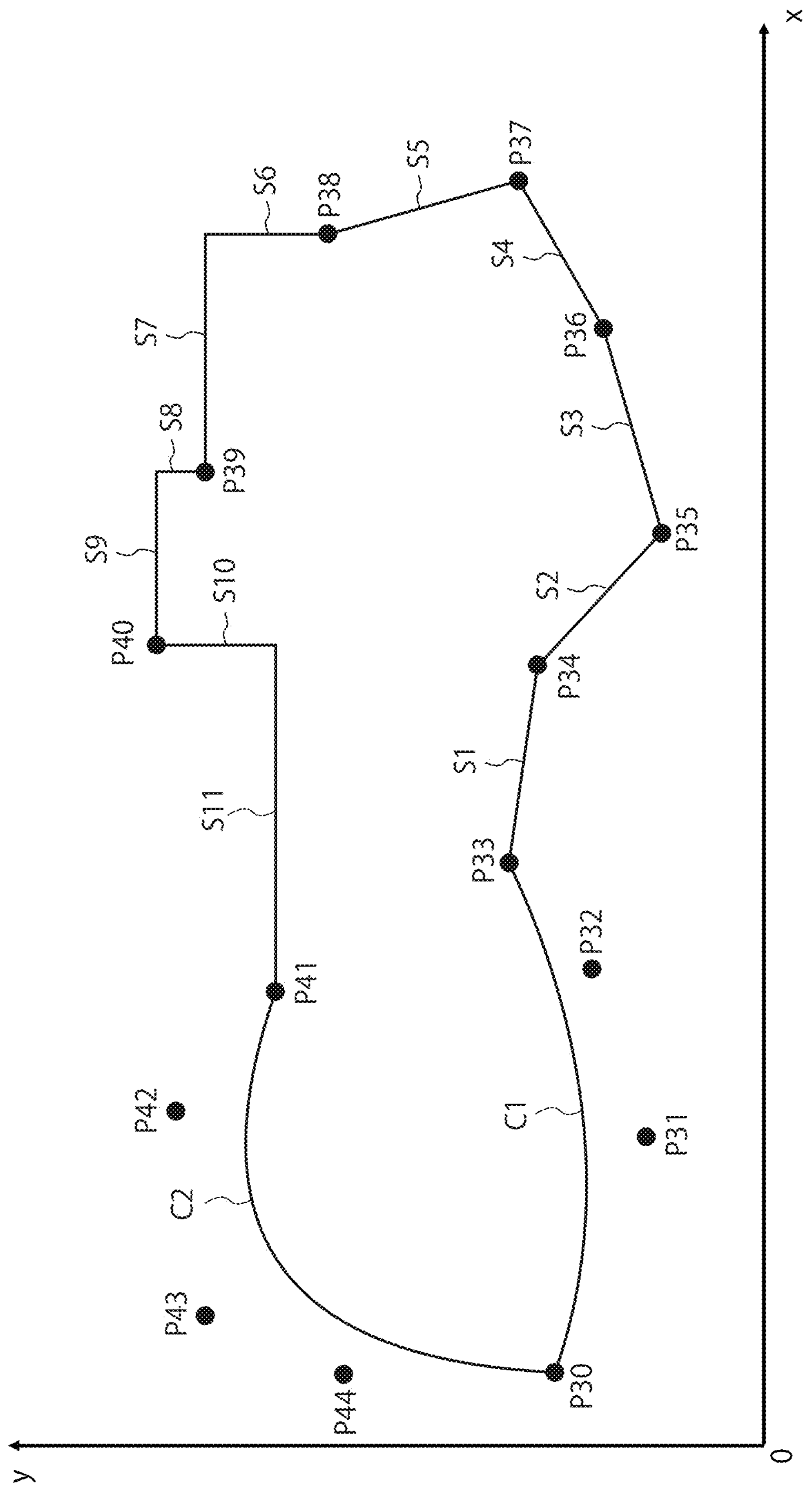
FIG. 8 is a diagram illustrating drawing data according to a second modification.

FIG. 8 is a diagram illustrating drawing data according to the second modification. In the first embodiment described above, the data examiner 521 examines the drawing data D1 formed of a closed curve.

However, in the present modification, the drawing data D1 is formed of a figure surrounded by curves C1 and C2 and straight lines S1 to S11 as illustrated in FIG. 8. Specifically, the drawing data D1 includes a curved figure and a polygonal figure.

The curve C1 is expressed by a B-spline curve defined with four control points P30, P31, P32, and P33. The coordinate of the control point P30 is defined as a figure disposition origin for the corresponding figure. The coordinate positions of the control points P31, P32, and P33 are each sequentially defined with an x-directional displacement and a y-directional displacement with respect to the previous control point.

The curve C2 is expressed by a curve defined with five control points P41, P42, P43, P44, and P30. As in the case of the curve C1, the coordinate positions of the control points are each sequentially defined with an x-directional displacement and a y-directional displacement with respect to the previous control point.

The straight line S1 is continuous with the curve C1 at the control point P33. Accordingly, the control point P33 is also the apex P33 of the polygonal figure. The straight line S1 connects the apexes P33 and P34. The coordinate position of the apex P34 is sequentially defined with an x-directional displacement and a y-directional displacement with respect to the previous apex P33.

The straight line S2 is continuous with the straight line S1 at the apex P34. The straight line S2 connects the apexes P34 and P35. The straight lines S3 to S11 each connect the corresponding pair of the apexes P35 to P41 and are continuous with each other. The coordinate position of each apex is sequentially defined with an x-directional displacement and a y-directional displacement with respect to the previous apex.

The conversion apparatus 70 expresses each straight line by using information that a straight line connects apexes. The conversion apparatus 70 also expresses the straight lines S6 and S7 by using information that a straight line of a right-angle type (Manhattan type) connects particular apexes (for example, the apexes P38 and P39).

In the present modification, the data examiner 521 examines whether a control point or apex exists inside the examination target region connecting three or more other control points or apexes with straight lines, as in the examination method described first in the first embodiment. In a case where the curve order of the drawing data D1 is two, the data examiner 521 may determine intersection of examination target line segments having ends at two control points or apexes, respectively, adjacent to each other, as in the examination method described second in the first embodiment.

In the present modification described above, as well, the data examiner 521 determines an examination result through outer product calculation processing in integers as in the first embodiment. Accordingly, calculation in floats and calculation of the solution of a high-order equation are unnecessary in the process of examination of the drawing data D1. Thus, drawing data including a curved figure and a polygonal figure can be examined at high accuracy and high speed.

Third Modification

A third modification of the first embodiment will be described below. The following description is mainly made on any difference from the first embodiment. In the present modification as well, the configuration of the drawing data D1 is different from that in the first embodiment.

Figure 9:
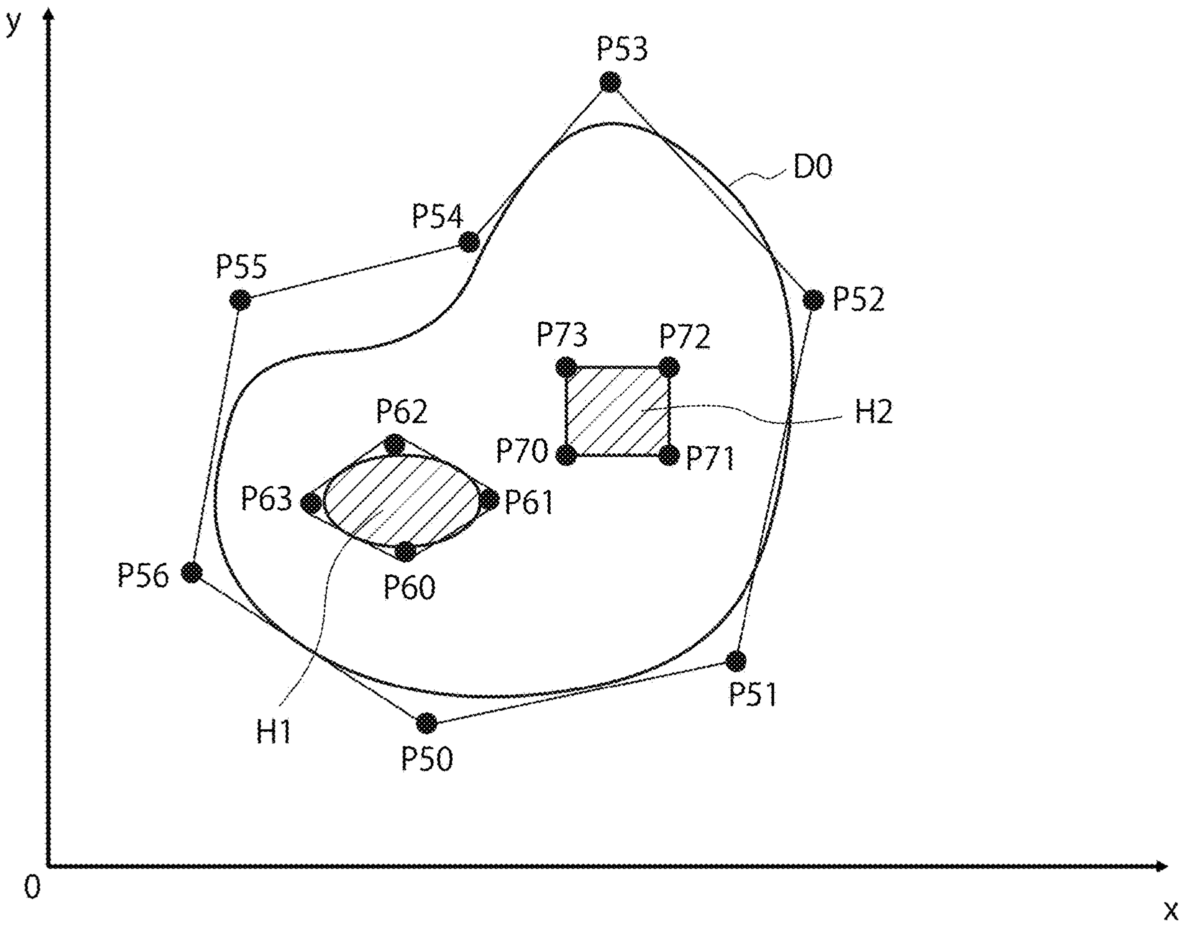
FIG. 9 is a diagram illustrating design data according to a third modification.

FIG. 9 is a diagram illustrating design data according to the third modification. In the first embodiment described above, the design data D0 is formed of only a figure surrounded by a closed curve.

However, in the present modification, the design data D0 has a hole H1 and a hole H2 inside an outer peripheral part surrounded by a closed curve as illustrated in FIG. 9. The hole H1 is an opening part surrounded by a closed curve. The hole H2 is an opening part surrounded by straight lines. In the present modification, the design data D0 has both holes H1 and H2, but may have only one of them.

In the present modification, the conversion apparatus 70 approximates the outer peripheral part of the design data D0 to a B-spline curve defined with control points P50 to P56. The conversion apparatus 70 also approximates the hole H1 to a B-spline curve defined with hole control points P60 to P63. In addition, the conversion apparatus 70 approximates the hole H2 to a B-spline curve defined with hole apexes P70 to P73.

In the present modification, the data examiner 521 may examine whether a hole control point or a hole apex exists inside the examination target region connecting, with straight lines, three or more control points among the control points P50 to P56, as in the examination method described first in the first embodiment.

In a case where the curve order of the drawing data D1 is two, the data examiner 521 may determine intersection of examination target line segments having ends at two control points, respectively, adjacent to each other, as in the examination method described first in the first embodiment.

In the present modification described above, as well, the data examiner 521 determines an examination result through outer product calculation processing in integers as in the first embodiment. Accordingly, calculation in floats and calculation of the solution of a high-order equation are unnecessary in the process of examination of the drawing data D1. Thus, drawing data having holes can be examined at high accuracy and high speed.

Second Embodiment

Figure 10:
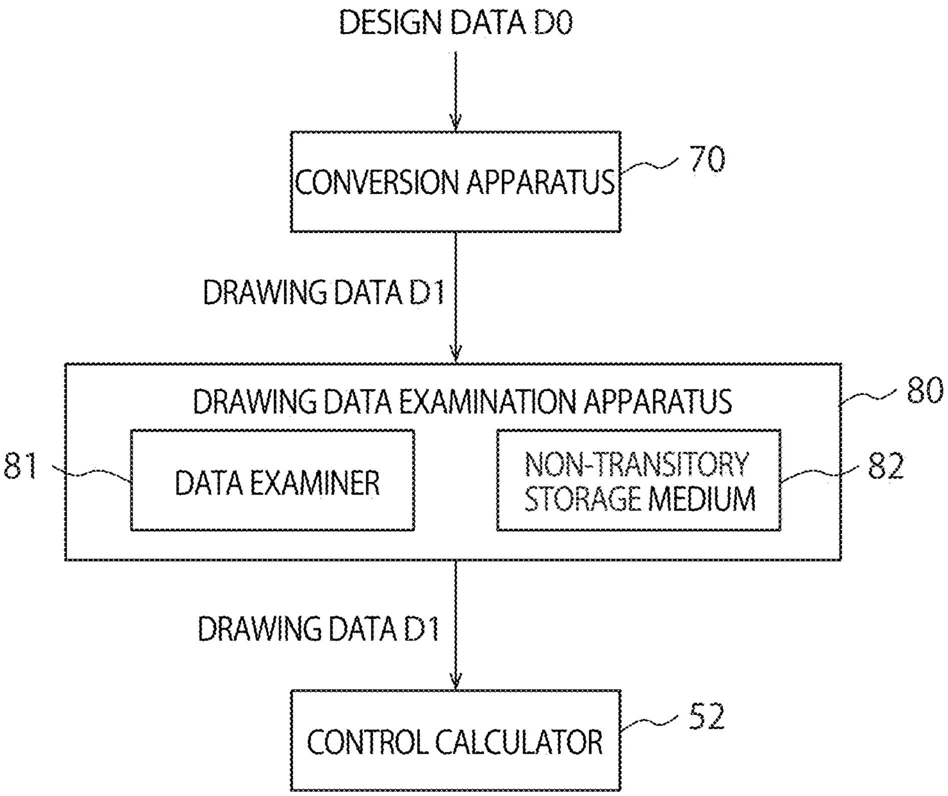
FIG. 10 is a block diagram illustrating a schematic configuration of a drawing data examination apparatus according to a second embodiment.

FIG. 10 is a block diagram illustrating a schematic configuration of a drawing data examination apparatus according to a second embodiment. In the present embodiment, the drawing data D1 generated by the conversion apparatus 70 according to the first embodiment described above is input to a drawing data examination apparatus 80.

As illustrated in FIG. 10, the drawing data examination apparatus 80 includes a data examiner 81 and a non-transitory storage medium 82. The data examiner 81 has the same function as the data examiner 521 described above in the first embodiment. Specifically, the present embodiment has a configuration in which the function of the data examiner 521 in the control calculator 52 of the drawing apparatus 1 according to the first embodiment is relocated at the drawing data examination apparatus 80 independent from the drawing apparatus 1. On the other hand, the non-transitory storage medium 82 stores a computer program that implements processing performed at the data examiner 81.

As in the first embodiment and the modifications, the data examiner 81 examines whether an examination target control point or an examination target apex exists inside the examination target region connecting three or more control points or apexes of the drawing data D1 with straight lines. In a case where the curve order of the drawing data D1 is two, it may be determined whether examination target line segments having ends at two control points or apexes, respectively, adjacent to each other in the drawing data D1 intersect each other as in the first embodiment and the modifications.

After the drawing data D1 passes the examination by the data examiner 81, the drawing data D1 is input to the control calculator 52. Thereafter, the drawing apparatus 1 emits a charged particle beam based on the drawing data D1.

According to the present embodiment described above, the data examiner 81 determines an examination result of the drawing data D1 through outer product calculation processing in integers. Thus, calculation in floats and calculation of the solution of a high-order equation are unnecessary in the process of examination of the drawing data D1. Accordingly, the drawing data can be examined at high accuracy and high speed.

In the present embodiment, the conversion apparatus 70 may be provided in the drawing data examination apparatus 80. In this case, the drawing data examination apparatus 80 includes a data generator, the data examiner 81, and the non-transitory storage medium 82, the data generator being configured to generate the drawing data D1 based on the input design data D0.

At least part of the examination function of the drawing data examination apparatus 80 described above in the present embodiment may be configured by hardware or software. In a case of the configuration by software, a computer program that implements at least part of the examination function of the drawing data examination apparatus 80 may be stored in the non-transitory storage medium 82 such as a flexible disk or a CD-ROM and read and executed by a computer. The non-transitory storage medium 82 is not limited to a detachable medium such as a magnetic disk or an optical disk but may be a fixed non-transitory storage medium such as a hard disk device or a memory.

The computer program that implements at least part of the examination function of the drawing data examination apparatus 80 may be distributed through a communication line (including wireless communication) such as the Internet. Moreover, the computer program may be encrypted, modulated, or compressed and then may be distributed in this state through a wired or wireless line such as the Internet or storage in a non-transitory storage medium.

The present invention is not limited to the above-described embodiments but may be embodied with modified constituent components without departing from the scope thereof when performed. Various kinds of inventions may be formed by appropriate combination of a plurality of constituent components disclosed in the above-described embodiments. For example, some constituent components may be deleted from among all constituent components presented in an embodiment. Moreover, constituent components in different embodiments may be combined as appropriate.

The invention claimed is:

1. A drawing data examination method for examining drawing data of a figure expressed by a B-spline curve, the drawing data being used by a drawing apparatus, the drawing data examination method comprising:

acquiring coordinates representing positions of a plurality of control points forming the B-spline curve;

setting, as an examination target region of the drawing data, a region surrounded by line segments connecting at least three or more control points adjacent to each other in the drawing data with straight lines after acquiring the coordinates;

performing calculation processing of specifying a relative position of an examination target control point with respect to the examination target region by using the coordinates of the examination target control point and control points of the examination target region with respect to the examination target region; and determining whether the drawing data passed or failed an examination by determining whether the examination target control point exists inside the examination target region based on the relative position.

2. The drawing data examination method according to claim 1, further comprising:

setting a first examination target line segment and a second examination target line segment after acquiring the coordinates in a case where the B-spline curve has an order of two, the first examination target line segment connecting [i]-th and [i+2]-th control points among the plurality of control points, the second examination target line segment connecting [k−1]-th and [k (where k≠i+1)]-th control points among the plurality of control points;

specifying relative positions of the first examination target line segment and the second examination target line segment by calculation processing using the coordinates of the first examination target line segment and the second examination target line segment; and determining whether the drawing data passed or failed an examination by determining whether the first examination target line segment and the second examination target line segment intersect each other based on the relative positions of the first examination target line segment and the second examination target line segment.

3. A drawing method of emitting a charged particle beam based on drawing data examined by the drawing data examination method according to claim 1.

4. A drawing apparatus configured to examine drawing data of a figure expressed by a B-spline curve, the drawing apparatus comprising:

processing circuitry configured to:

acquire coordinates representing positions of a plurality of control points forming the B-spline curve;

set, as an examination target region of the drawing data, a region surrounded by line segments connecting at least three or more control points adjacent to each other in the drawing data with straight lines after acquiring the coordinates;

perform calculation processing of specifying a relative position of an examination target control point with respect to the examination target region by using the coordinates of the examination target control point and control points of the examination target region with respect to the examination target region; and determine whether the drawing data passed or failed an examination by determining whether the examination target control point exists inside the examination target region based on the relative position.

5. A non-transitory storage medium storing a program causing a computer to implement:

processing of acquiring coordinates representing positions of a plurality of control points forming a B-spline curve expressing a figure of drawing data used by a drawing apparatus;

processing of setting, as an examination target region of the drawing data, a region surrounded by line segments connecting at least three or more control points adjacent to each other in the drawing data with straight lines after acquiring the coordinates;

calculation processing of specifying a relative position of an examination target control point with respect to the examination target region by using the coordinates of the examination target control point and control points of the examination target region with respect to the examination target region; and processing of determining whether the drawing data passed or failed an examination by determining whether the examination target control point exists inside the examination target region based on the relative position.

* * * * *